RANDOM SELECTOR

Filed May 3, 1962 2 Sheets-Sheet 1

INVENTORS
Murray W. Lindenthal
Richard C. Tagler
Joseph A. Bourget
By Fisher Christen & Goodson
Attorneys Aug. 10, 1965 M. W. LINDENTHAL ETAL 3,200,264

RANDOM SELECTOR

Filed May 3, 1962 2 Sheets-Sheet 2

INVENTORS
Murray W. Lindenthal
Richard C. Tagler
Joseph A. Bourget
BY Fisher Christen & Goodson
Attorneys United States Patent Office 3,200,264
Patented Aug. 10, 1965

3,200,264
RANDOM SELECTOR

Murray W. Lindenthal, Somerset, N.J., and Richard C. Tagler and Joseph A. Bourget, Baltimore, Md., assignors to Martin Marietta Corporation, Baltimore, Md., a corporation of Maryland Filed May 3, 1962, Ser. No. 192,116
4 Claims. (Cl. 307—88.5)

Figure 1:
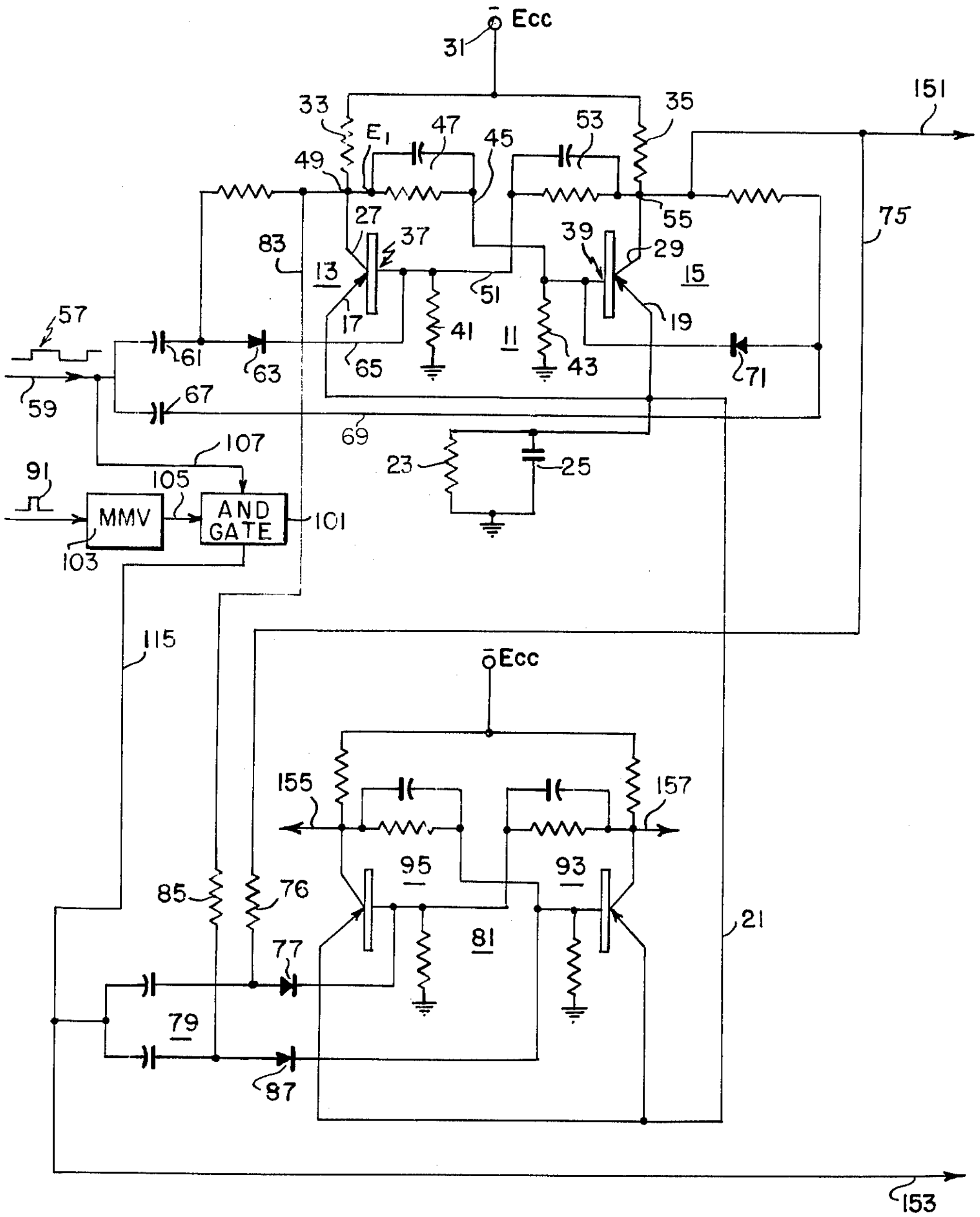

The present invention relates to apparatus and a method for selecting at random an event or count from a series of events or from a pulse train or sequence. More particularly, the invention provides memory apparatus in connection with or connectable to counting apparatus and responsive to a "memorize" signal for storing the count of the counter. The invention permits the count selection at random without interfering with the counter function. The usual reset operation is avoided and in addition there is no need for any erase or memory conditioning signal.

The invention will be described in connection with a continuously running electronic counter of the binary type which is operated by electric pulses in a pulse sequence or in a counter clock square wave. The counter need not be run by a continuous pulse sequence nor is there a requirement that the counting pulses be uniform or uniformly spaced in time. While the circuit parameters are adjustable, it should be noted that nevertheless the counting pulses must be of sufficient time duration to operate the counting apparatus, e.g., switch a "flip-flop" from one state to the other and under certain conditions, to obtain the highest degree of accuracy, the memory signal must bear a time-relation to the counting pulses.

Electronic counters are by now well known and widely employed. They may simply be used to count pulses or may be an integral part of highly complex computing equipment. In the binary type counter, two or more binary or bi-stable state counting stages are coupled together to permit counting in the decimal system. In this manner a series of bi-stable elements or circuits may be used to count "on-off" or "0–1" conditions, with each successive stage being triggered by its input stage in binary manner. High speed multi-stage transistorized flip-flop circuits are now of conventional design and are useful as a part of or in combination with the present invention.

When a binary counter is to be monitored, a bi-stable type memorizing apparatus is used in the invention to duplicate and store, at any given time, the condition of the corresponding counting apparatus. The counting apparatus conditions the input to the memory apparatus on each count such that first one and then the other of its bi-stable states is receptive to a "memory" signal.

Under certain conditions, when the memorize signal is random in its occurrence, any problems which might arise as a result of propagation error may be eliminated by the use of computer circuits coupled together in a novel manner. For example, errors could be introduced if the memory signal arrived when the counter was changing states. Consequently, the memory signal may develop or may be converted into a condition or gating signal which exists for a time interval in excess of the counter propogation time or the width of any counting pulse. Then the use of a computer type "AND" circuit will insure that the memory apparatus will be caused to sample the condition of the counter apparatus at a time other than at its switching time.

When the binary system is employed both the counting and memory stages may comprise multivibrators which can be transistorized to permit operation and readout at rates from D.C. into the megacycle range. Readout may also be effected at random and without interference with the counting function.

Bearing in mind the foregoing, an object of the present invention is to provide a novel method and apparatus for memorizing the count of a counter at random without the necessity of stopping it or interferring with its function or resetting it.

A further object of the invention is the provision of readout of any such count from the memory while the counter remains in operation.

Still a further object of the invention is the provision of such count retention with high accuracy regardless of the counter speed or frequency of operation, and An even further object of the invention is a novel arrangement for sampling the counter at a time other than during switching or triggering.

Figure 2:
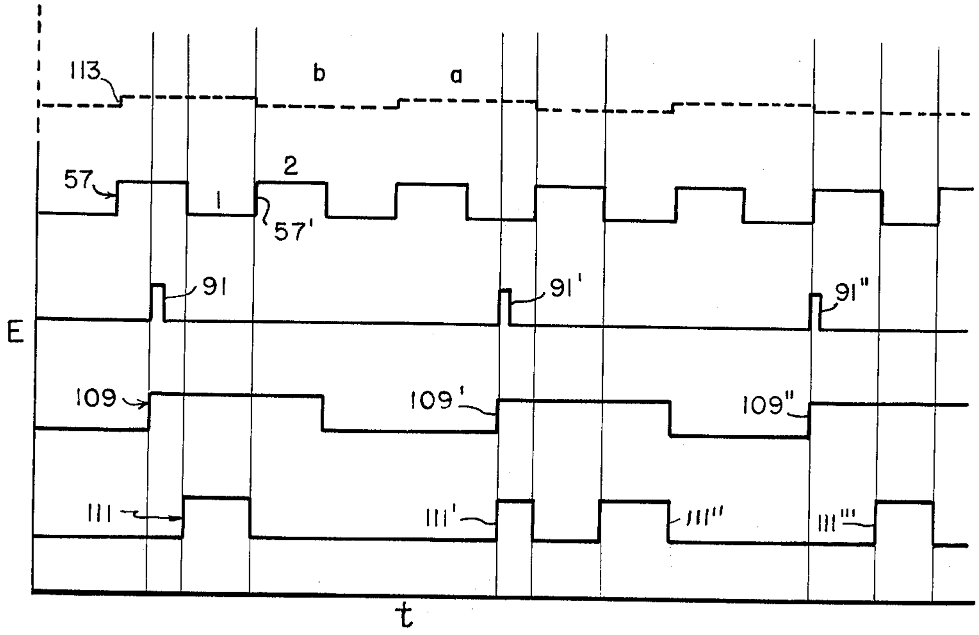

The invention will be best understood and other aspects and features thereof will be appreciated from the following detailed description of a preferred embodiment thereof, when read in the light of the accompanying drawings in which:

FIG. 1 is a suitable circuit and block-type diagram of a counter and memory stage coupled for sampling the count, and FIG. 2 is a wave-form diagram useful for explaining the operation of the circuitry of FIG. 1, such diagram showing wave forms or pulses and operating conditions with voltage magnitudes plotted as the ordinate to a common-time scale as the abscissa.

*General*

Referring now to FIG. 1 of the drawings, one stage of a transistorized binary counter is shown generally at 11. The binary flip-flop 11 comprises two transistors 13 and 15 connected for bi-stable operation for representing the binary values or bits "0" and "1" respectively.

The transistors 13 and 15 are shown as of the P-N-P type having an N-type crystal into which holes are injected as indicated by the arrow of the emitter 17. Of course either type transistor may be employed following widely established principles.

The emitter 17 of transistor 13 is connected to the emitter 19 of transistor 15 over lead 21 which is grounded through resistor 23 in parallel with by-pass capacitor 25. The collectors 27 and 29 of transistors 13 and 15 are connected to a negative source of potential $E_{cc}$ applied at terminal 31 by way of resistors 33 and 35. The bases 37 and 39 of transistors 13 and 15 are respectively grounded via resistors 41 and 43.

The base 39 of transistor 15 is connected over lead 45 and by way of the RC network 47 to the junction point 49 of collector 27 of transistor 13 and resistor 33. Similarly, the base 37 of transistor 13 is connected over lead 51 and by way of RC network 53 to the corresponding junction point 55. It is this cross-coupling which permits triggering and holding of the bi-stable state arrangement from conduction in one transistor to conduction in the other transistor. For example, when transistor 13 is conducting current, transistor 15 is substantially cut off and vice versa. These are the two operating states permitting the binary values "0" and "1" to be represented. It is, of course, a straightforward analog of a conventional vacuum tube flip-flop and the counter descrbed may be of well-known standard design.

In one of the two operating states, current is conducted by transistor 13 and the voltage drop across resistor 33 causes the potential of junction point 49 ($E_1$) to become less negative than the $-E_{cc}$ supply voltage at terminal 31. Junction 49 is the output point for transistor 13. Similarly, when conduction is shifted to transistor 15 its associated junction point 55 becomes less negative than its $-E_{cc}$ valve. The output voltage level of transistor 15 has thus been caused to change from $-E_{cc}$ to some potential considerably less than $-E_{cc}$.

Triggering of the circuit 11 from one operating state to the other is achieved by pulses, such as, by the square waves or counter-clock pulse train pictured at 57 (FIGS. 1 and 2) and applied to input lead 59. One branch of the input circuit for the clock or pulse train 57 is by way of coupling capacitor 61 and diode 63 (which may be of the crystal type) in lead 65 which extends to the base 37 of transistor 13. A similar path is extended from input lead 59 over coupling capacitor 67, via lead 69 and diode 71 to the base 39 of transistor 15. The input circuit described is a binary input path in contrast to two direct input paths thereby permitting pulses of a single polarity to switch the multivibrator 11. In the case of P.N.P., this polarity will be positive.

The polarity of rectifiers 63 and 71 is such that the circuit is responsive only to positive going triggering pulses. Thus, each time the voltage of the clock wave 57 is increased in the positive direction, such as at 57' (FIG. 2), the counter circuit is triggered from one bi-stable state to the other.

It should now be appreciated that the counting circuit depicted in FIG. 1 may represent the first or initial stage of a binary of scale-of-two counter. The remaining stages (not shown) may be exact duplicates of the counter of FIG. 1 with the second stage being tied to point 55 (shown by the arrow 151) and the third stage to the second stage at a point corresponding to 55 and so forth for as many stages as are required. Triggering of the second stage would then be effected each time the condition of current is transferred from transistor 15 to transistor 13 thereby affording a positive going pulse at junction point 55. This, of course, occurs upon the receipt of alternate ones of the triggering pulses supplied on input line 59.

*Operation*

Assume that transistor 13 is conducting such that its collector 27 will be at potential $E_1$ of junction point 49. Of course, transistor 15 will be in the nonconducting state and its collector 29 will be substantially at the more negative potential *Ecc*, as measured at point 55. The supply potential $-Ecc$ is thus effective to apply a reverse bias over lead 75 and by way of resistor 76 to diode 77 located in the binary input circuit 79 for the memory or marking circuit 81. The potential $E_1$ applied over lead 83 and by way of resistor 85 establishes at this time substantially zero reverse bias on diode 87. The difference between the potentials effective at diodes 77 and 87 is such as will permit the memorizing signal 91 (FIG. 2) to pass through only diode 87. In other words, the negative potential *Ecc* reverse biases diode 77 sufficiently to prevent the passage of the positive memory pulse 91, whereas the potential $E_1$, effective at rectifier 87, is readily overcome by the positive pulse 91.

Thus, for the condition of conduction in transistor 13 of the counting circuit, the memory circuit receives the positive going pulse 91 by way of diode 87 to turn off transistor 93 and consequently establish conduction in transistor 95. It may be appreciated that the same situation of conditions therefor obtains in the memory circuit 81 as in the counting circuit 11 in response to the random memory or mark pulse 91. Prior to the occurrence of memory pulse 91 the counting circuit 11 alternately primed the diodes 77 and 87 of the memory circuit 81 in accordance with the state of conduction in the counting circuit.

The memory circuit 81 has now memorized the condition of counting circuit 11 and this memory will hold until the appearance of the next memory signal 91 which may, of course, occur at random. The memory circuit may be similar or identical to the counting stage described with the exception of output circuits, which will be discussed hereinafter. Moreover, the common ground return resistor 23 and bypass capacitor 25 may be shared by both circuits.

*Propagation provision*

It has heretofore been mentioned that a feature of the present invention is the ability to mark or memorize a count of a continually operating counting device without interfering with its function. While the invention is capable of doing this in a very high speed operation, it is necessary to take into account the propagation time of the counter if the memorizing signal is to appear at random. The real problem which arises is due to the fact that the memory signal might arrive at the time that the counter is changing states and it could prove ineffectual for its purpose.

For this reason the "AND" gate 101 (FIG. 1) may be employed to correlate the effective time of the memory pulse with the counter operation. The memory signal 91 (FIGS. 1 and 2) is applied to a monostable multivibrator 103 which may be of conventional design with the only requirement being that its period be greater than the propagation time of the counter circuit 11. The output of the monostable multivibrator 103 is applied over lead 105 to the "AND" gate 101 with the other input thereto being the clock wave 57 (FIGS. 1 and 2) by way of leads 59 and 107.

From a consideration of FIG. 2 it will be seen that the one-shot multivibrator 103 produces its output pulse as wave form 109 upon the arrival of each memorizing pulse 91. The pulse 91 is of course the triggering energy for the multivibrator 103 and the output therefrom is applied to the "AND" gate 101. Three different *and* conditions may be encountered as between the time of occurrence of the random memory pulse 91 and the clock wave 57.

The first such situation is depicted at the left side of FIG. 2 wherein the pulse 91 occurs while the clock wave is undergoing its positive half cycle, depicted as position 2. The "AND" gate 101 is arranged to operate only when it receives a pulse from multivibrator 103 together with the negative portion of clock wave 57, shown at position 1. Note that while positive and negative are utilized with respect to counter-clock wave 57 and other pulses herein, this may in fact not be true depending of course upon the reference plane. Hence position 1 and position 2 may be used to describe the clock wave 57. The "AND" gate 101, which may be of conventional character, provides an output only if it receives an output from multivibrator 103 together with the clock wave 57 in position 1.

It thus may be appreciated that the output of multivibrator 103 persists throughout the remainder of position 2 of clock wave 57 and also the following position 1, thereby to permit an output from "AND" gate 101. Such an output is shown by the wave form 111 (FIG. 2).

To correlate transistor operation with this timing, the broken line chart 113 appearing at the top of FIG. 2 is used. It is associated with this figure only with respect to the abscissa axis *t*, to indicate the alternate conduction in transistors 13 and 15.

It will be recalled that in the example used, transistor 13 was in the conducting state and transistor 15 in the nonconducting state such that rectifier 87 for the memory circuit 81 was responsive to an output from the "AND" gate 101. The "AND" gate pulse 111 is applied over lead 115 to the input circuit 79 for the memory circuit 81. It follows a path over rectifier 87 to turn off transistor 93 and consequently turn on transistor 95. Thus, transistor 95 has now "memorized" the condition of transistor 13 and in fact the memory circuit 81 now stores the instantaneous condition of the counting circuit 11. Because of the double input path 79 to the flip-flop circuit 81, pulses of one polarity only are necessary to trigger the circuit back and forth, and when a PNP transistor is used, a positive pulse will cut it off.

From FIG. 2 it is seen that the period of the monostable multivibrator 103 is such that its output pulse 109 exists at least throughout position 1 of the clock wave 57, even though it was initiated during position 2 thereof. It is this coexistence which provides the output pulse 111 from the "AND" gate 101.

A different timing condition for the occurrence of a further random memorize signal 91′ is shown at the center of FIG. 2. The random memorize signal is depicted as occurring during position 1 of the counter-clock wave 57 and while transistor 13 is conducting, as is represented at *a* in the upper broken line time chart 113. The condition for an output from the "AND" gate 101 is satisfied because the monostable output pulse 109′ is simultaneously present with position 1 of clock wave form 57. The resulting pulse 111′ appears on lead 115 and is applied to memory input circuit 79. The pulse 111′ is shown to have a short duration which may not be sufficient to effect switching of the memory circuit.

This is a matter of design relative to the frequency of operation, and this situation is presented simply to reveal the manner in which the present invention copes with transient situations. As the clock wave 57 rises to position 2 it ceases to satisfy the requirement at the "AND" gate 101 and, although the monostable pulse 109′ is present at the gate, no output is produced on lead 115.

In this manner the memory circuit 81 is not permitted to "memorize" at the time the clock wave 57 rises in the positive direction because this is the action which triggers the initial binary counting stage 11. However, when the clock wave 57 again drops to position 1, the monostable pulse 109′ persists and the "AND" gate 101 provides a full output pulse 111″ to lead 115. Again this pulse passes diode 87 to shift conduction to transistor 95 thereby "memorizing" the count of counter 11 with an accuracy of one count. This may be seen in connection with the broken line time conduction chart 113, where it will be noted that condition *b* obtains which means transistor 15 has assumed the conducting state and transistor 13 is nonconducting.

For such high-speed operation and to insure the one-count accuracy for the depicted transient condition, the period of the monostable output wave 109 must be greater than one-half the period of the counter clock square wave 57 but less than twice the period of the square wave.

The third random appearance of a "memorize" signal, such as signal 91″, is shown at the right hand side of FIG. 2. From time chart 113 it will be noted that transistor 13 is initially conducting and that the wave 57 is just rising to position 2, thereby switching conduction from transistor 13 to transistor 15. This represents the most difficult time to attempt to "memorize" the count of counter 11 because it is in the process of switching. Accordingly, the appearance of monostable output pulse 109″ at the "AND" gate 101 is ineffective to provide an output because clock wave 57 is not in position 1.

Nothing happens until the clock wave falls to position 1 at which time, of course, the "AND" gate provides an output pulse 111‴ to lead 115, the pulse 111‴ has a duration until the clock wave 57 rises to position 2. It is permitted to pass through rectifier 77 to memory circuit 81 because this rectifier is forward biased or almost forward biased due to the fact that transistor 15 of the counting stage 11 is in the conducting state. The result is the switching of memory circuit 81 to establish conduction in transistor 93 to duplicate the condition of the counting stage 11.

*Multi-stage*

It should now be obvious to those skilled in the art that the counter stage 11 may be simply repeated or extended since the counter apparatus may comprise as many stages as are desired. The output for the next succeeding stage is taken from point 55, i.e., collector 29 of transistor 15, as is represented by the arrow 151. The stage 11 will produce only one output pulse for two input pulses which is required for the bistable multivibrator to return to a given initial state. Thus, while the stage 11 counts pulses by two (one out for every two in) and is called a binary counter, two such stages in series will obviously count by four and so on.

The importance of this invention to digital computers should be easily recognized now and the only transfer connection required is from point 151 to the next stage and from a corresponding point (now shown) to the next further stage and so forth.

On the other hand, the memory unit 81 is not dependent upon transfers but rather receives its priming or the block or non-blocking input condition from its associated counting stage and its operative condition from any given random "memorize" signal. Consequently, the memory circuit 81 is simply duplicated for each additional counter stage with the output of the common "AND" gate 101 being applied to each such duplicate memory unit over common lead 153.

The fact that a single "AND" gate such as 101 and a single monostable multivibrator 103 will suffice for a multi-stage counter is because switching is effected throughout the stages almost simultaneously. Accordingly, if the "AND" gate signal is developed at a non-switching time for stage one it will also be effective for the other stages at such a time.

The memory circuit 81 is provided with a pair of output connections 155 and 157 which may extend to appropriate indicator lamps, recording means, or may be used to develop potential levels or signals indicative of the stored or marked count, in any well-known manner. The apparatus of the invention, of course, is capable of memorizing counts at regular intervals at predetermined times, or at random as required. The counting section may be operated as a timing device, for example, and the random signal may be developed upon the occurrence, termination, or change in an event thereby permitting or causing the memory section to mark such action.

While the invention has been described with respect to a preferred embodiment thereof, it should be apparent to those familiar with the art that its applicability and scope are broader than the single embodiment depicted, and accordingly, it is intended that the patent be limited only by the scope of the appended claims wherein what is claimed is:

1. A count memorizing apparatus comprising: an electrical counter circuit adapted to assume a plurality of electrical conditions in response to a clock signal,
   said circuit having an input means for receiving a clock signal;
      an electrical memory circuit capable of assuming a plurality of electrical conditions corresponding to said conditions to said counter circuit;
      means for receiving a random memorize pulse;
      coincidence means connected to said clock signal input means and said memorize pulse input means for providing an output pulse at a time other than the time during which said counter is changing electrical condition; and
      means controlled by the electrical condition of said counter circuit for applying an output of said coincidence means to said memory circuit so as to cause said memory circuit to assume an electrical condition corresponding to the electrical condition of said counter circuit.

2. The apparatus of claim 1 further including means located between said random memorize pulse receiving means and said coincidence means for altering the duration of a memorize pulse to a period of time that is greater than the propagation time of said binary counter and between one-half and twice the period of a clock signal.

3. A count memorizing apparatus comprising: an electrical counter circuit adapted to assume a plurality of electrical conditions in response to changes in potential of cyclical clock wave, said circuit having an input means for receiving a cyclical clock wave;

an electrical memory circuit capable of assuming a plurality of electrical conditions corresponding to said conditions to said counter circuit;

means for receiving a random memorize pulse;

coincidence means connected to said clock signal input means and said memorize pulse input means for providing an output pulse only during the period of coexistence of a memorize pulse and a selected potential range of a cyclical clock wave; and gate means selectively enabled by the electrical condition of said counter circuit for applying said coincidence means output to said memory circuit so as to cause said memory circuit to assume an electrical condition corresponding to the electrical condition of said electrical counter circuit.

4. A count memorizing apparatus comprising: means for receiving a clock signal;

a bistable binary counter connected to said clock signal receiving means and containing two sections, each of said sections developing alternatively one of two different potentials per section in response to a clock signal;

a bistable memorizing circuit containing two sections, each of said sections capable of developing alternatively one of two different potentials per section corresponding to said potentials developed by said binary counter sections;

means for receiving a random memorize signal;

means connected to said memorize signal receiving means for altering the duration of a memorize signal to a period of time that is greater than the propagation time of said binary counter and that is between one-half and twice the period of a clock signal;

coincidence means connected to said signal duration altering means and to said clock signal receiving means for receiving an altered duration memorize signal and a clock signal and adapted to provide an output only during the period of co-existence of an altered duration memorize signal and a selected portion of a clock signal;

a pair of electrical paths connecting said coincidence means to each of said memorizing circuit sections for applying said coincidence means output to both of said sections, said coincidence means output being adapted to control conduction in such section;

a pair of gate means, one in each of said paths, for controlling the passage of said coincidence output to said memorizing circuit sections, each said gate having an enabling connection; and an electrical connection between each said section of said binary counter and said enabling connection of a separate one of said gates whereby the potential developed by said counter selectively enable said gates so that a particular coincidence means output results in establishing electrical potentials in said memorizing circuit sections corresponding to said electrical potentials in said binary counter sections.

References Cited by the Examiner

UNITED STATES PATENTS

| | | | |
|---|---|---|---|
| 2,848,166 | 8/58 | Wagner | 328—52.5 |
| 2,966,614 | 12/60 | Favre | 307—88.5 |
| 3,020,418 | 2/62 | Emile | 307—88.5 |

ARTHUR GAUSS, *Primary Examiner.*

DAVID J. GALVIN, JOHN W. HUCKERT, *Examiners.*

UNITED STATES PATENT OFFICE
CERTIFICATE OF CORRECTION

Patent No. 3,200,264 August 10, 1965

Murray W. Lindenthal et al.

It is hereby certified that error appears in the above numbered patent requiring correction and that the said Letters Patent should read as corrected below.

Column 3, line 22, for "of", second occurrence, read -- or --; column 6, line 54, for "to", second occurrence, read -- of --; column 7, line 2, for "of cyclical" read -- of a cyclical --; line 7, for "to said counter" read -- of said counter --; column 8, line 21, for "potential" read -- potentials --.

Signed and sealed this 28th day of June 1966.

(SEAL)
Attest:

ERNEST W. SWIDER
Attesting Officer

EDWARD J. BRENNER
Commissioner of Patents